United States Patent [19]

Seelert et al.

[11] Patent Number: 5,483,002
[45] Date of Patent: Jan. 9, 1996

[54] PROPYLENE POLYMERS HAVING LOW-TEMPERATURE IMPACT STRENGTH

[75] Inventors: Stephan Seelert, Frankenthal; Franz Langhauser, Bad Dürkheim; Jürgen Kerth, Carlsberg; Patrik Müller, Kaiserslautern; David Fischer, Gönnheim; Günther Schweier, Friedelsheim, all of Germany

[73] Assignee: BASF Aktiengesellschaft, Ludwigshafen, Germany

[21] Appl. No.: 303,717

[22] Filed: Sep. 9, 1994

[30] Foreign Application Priority Data

Sep. 10, 1993 [DE] Germany ............... 43 30 661.5

[51] Int. Cl.$^6$ ............................................. C08L 23/12
[52] U.S. Cl. ................................................... 525/240
[58] Field of Search .................................... 525/240

[56] References Cited

U.S. PATENT DOCUMENTS

| | | | |
|---|---|---|---|
| 3,846,349 | 11/1974 | Harada et al. | 525/240 |
| 4,296,022 | 10/1981 | Hudson | 525/240 |
| 4,892,851 | 1/1990 | Ewen et al. | 526/351 |
| 4,937,299 | 6/1990 | Ewen et al. | 526/119 |
| 4,975,403 | 12/1990 | Ewen | 526/160 |
| 4,977,210 | 12/1990 | Kerth et al. | 525/53 |
| 5,264,493 | 11/1993 | Palate et al. | 525/240 |
| 5,280,074 | 1/1994 | Schreck et al. | 525/240 |
| 5,281,679 | 1/1994 | Jejelowo et al. | 526/160 |
| 5,304,614 | 4/1994 | Winter et al. | 526/127 |
| 5,331,054 | 7/1994 | Fujita et al. | 525/240 |

FOREIGN PATENT DOCUMENTS

| | | |
|---|---|---|
| 0455813 | 6/1991 | European Pat. Off. . |
| 550214 | 7/1993 | European Pat. Off. . |
| 3827565 | 2/1990 | Germany . |
| 433990 | 6/1991 | Germany . |
| 4001157 | 7/1991 | Germany . |
| 4130429 | 3/1993 | Germany . |

*Primary Examiner*—Thomas Hamilton, III
*Attorney, Agent, or Firm*—Keil & Weinkauf

[57] ABSTRACT

Propylene polymers contain
A) a semicrystalline propylene homopolymer having a melting point of 125 to 165° C. and a glass transition temperature which is greater than −10° C. and
B) a semicrystalline propylene homopolymer having a melting point below 130° C. and a glass transition temperature which is less than or equal to −10° C. or a non-crystallizing propylene homopolymer having a glass transition temperature which is less than or equal to −10° C.

7 Claims, No Drawings

PROPYLENE POLYMERS HAVING LOW-TEMPERATURE IMPACT STRENGTH

The present invention relates to propylene polymers containing
- A) a semicrystalline propylene homopolymer having a melting point of 125 to 165° C and a glass transition temperature which is greater than −10° C. and
- B) a semicrystalline propylene homopolymer having a melting point below 130° C. and a glass transition temperature which is less than or equal to −10° C. or a non-crystallizing propylene homopolymer having a glass transition temperature which is less than or equal to −10° C.

The present invention furthermore relates to processes for the preparation of such propylene polymers, their use for the production of fibers, films and moldings, and the fibers, films and moldings obtainable from the propylene polymers.

DE-A 38 27 565 and DE--A 40 01 157 describe propylene polymers which have low-temperature impact strength and consist of a rigid homopolypropylene matrix and an ethylene/propylene elastomer. The homopolypropylene matrix and the ethylene/propylene elastomer are prepared in different polymerization units and then mixed in an extruder, or a reactor cascade is used, the homopolypropylene matrix being produced in the first reaction zone and an ethylene/propylene elastomer then being polymerized with said matrix in a second or, if required, further reaction zone. These preparation processes are described in EP-A 433 990 and DE--A 41 30 429. However, the use of two different monomers makes these processes technically complicated since the reaction procedures in the individual reaction zones must be tailored to one another and furthermore the transfer from one reaction zone to another gives rise to difficulties with regard to control engineering.

It is an object of the present invention to remedy the disadvantages described and to provide propylene polymers which have low-temperature impact strength and can be prepared with cheap processing engineering.

We have found that this object is achieved by the propylene polymers defined at the outset. We have also found processes for the preparation of such propylene polymers, their use for the production of fibers, films and moldings, and fibers, films and moldings obtainable from the propylene polymers.

The novel propylene polymers can be prepared by mixing the components A) and B) in a conventional apparatus, such as a Brabender mixer, a kneader or extruder. However, the novel propylene polymers are preferably prepared in a single reaction zone in the presence of two different catalyst systems. Two different propylene homopolymers A) and B) are obtained by polymerizing propylene over the two different catalyst systems.

Suitable catalyst systems for the preparation of the semicrystalline propylene homopolymers A) are, for example, Ziegler-Natta catalysts.

In addition to a titanium-containing solid component, said catalysts also contain, inter alia, a.cocatalyst. A suitable cocatalyst is an aluminum compound. An electron donor compound is preferably used as further component of the cocatalyst, in addition to this aluminum compound. The polymerization is carried out in the reactors usually used in industry for polymerization reactions, preferably in the gas phase.

For the preparation of the titanium-containing solid component, the titanium compounds used are in general halides or alcoholates of trivalent or tetravalent titanium, the chlorides of titanium, in particular titanium tetrachloride, being preferred. The titanium-containing solid component advantageously contains a finely divided carrier, and silicas and aluminas as well as aluminum silicates of the empirical formula $SiO_2 \cdot aAl_2O_3$, where a is from 0.001 to 2, in particular from 0.01 to 0.5, have proven useful for this purpose. Further carriers include finely divided polyolefins, for example finely divided polypropylene.

Compounds of magnesium are among the further substances used in the preparation of the titanium-containing solid component. Particularly suitable compounds of this type are magnesium halides, alkylmagnesiums and arylmagnesiums, as well as alkoxymagnesium and aryloxymagnesium compounds, magnesium chloride, magnesium bromide and di-$C_1$–$C_{10}$-alkylmagnesium compounds being preferably used. The titanium-containing solid component may also contain halogen, preferably chlorine or bromine.

The titanium-containing solid component furthermore contains electron donor compounds, for example mono- or polyfunctional carboxylic acids, carboxylic anhydrides and carboxylic esters, as well as ketones, ethers, alcohols, lactones and organophosphorus and organosilicon compounds. Electron donor compounds which are preferably used within the titanium-containing solid component are phthalic acid derivatives of the formula III

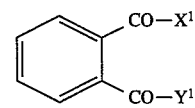

where $X^1$ and $Y^1$ are each chlorine or $C_1$–$C_{10}$-alkoxy, or together are oxygen. Particularly preferred electron donor compounds are phthalic esters, where $X^1$ and $Y^1$ are $C_1$–$C_8$-alkoxy, for example methoxy, ethoxy, propoxy or butoxy.

Further preferred electron donor compounds within the titanium-containing solid component include diesters of 3-membered or 4-membered, unsubstituted or substituted cycloalkane-1,2-dicarboxylic acids and monoesters of unsubstituted or substituted benzophenone-2-carboxylic acids.

The hydroxy compounds used in the case of these esters are the alcohols usually employed in esterification reactions, including $C_1$–$C_{15}$-alkanols, $C_5$–$C_7$-cycloalkanols, which in turn may carry $C_1$–$C_{10}$-alkyl groups, and $C_6$–$C_{10}$-phenols.

The titanium-containing solid component can be prepared by methods known per se. Examples of these are described in, inter alia, EP-A 45 975, EP--A 45 977, EP--A 86 473, EP-A 171 200, GB-A 2 111 066 and U.S. Pat. No. 4,857,613.

The titanium-containing solid component thus obtainable is used with cocatalysts as a Ziegler-Natta catalyst system. Suitable cocatalysts are aluminum compounds and further electron donor compounds.

Aluminum compounds suitable as cocatalysts are, in addition to trialkylaluminum, also compounds in which an alkyl group is replaced with an alkoxy group or with a halogen atom, for example with chlorine or bromine. Trialkylaluminum compounds whose alkyl groups are each of 1 to 8 carbon atoms, for example trimethyl-, triethyl- or methyldiethylaluminum, are preferably used.

In addition to the aluminum compound, electron donor compounds, for example mono- or polyfunctional carboxylic acids, carboxylic anhydrides and carboxylic esters, as well as ketones, ethers, alcohols, lactones and organophosphorus and organosilicon compounds, are preferably used as further cocatalysts. Preferred electron donor compounds are organosilicon compounds of the formula IV $$R^{14}{}_p Si(OR^{15})_{4-p} \qquad \text{IV}$$

wherein the radicals $R^{14}$ are identical or different and are each $C_1$–$C_{20}$-alkyl, 5-membered to 7-membered cycloalkyl which in turn may carry a $C_1$–$C_{10}$-alkyl group, or $C_6$–$C_{20}$-aryl or $C_7$–$C_{40}$-arylalkyl, the radicals $R^{15}$ are identical or different and are each $C_1$–$C_{20}$-alkyl and p is 1, 2 or 3. Particularly preferred compounds are those in which $R^{14}$ is $C_1$–$C_8$-alkyl or 5-membered to 7-membered cycloalkyl, $R^{15}$ is $C_1$–$C_4$-alkyl and p is 1 or 2.

Among these compounds, dimethoxydiisopropylsilane, dimethoxyisobutylisopropylsilane, dimethoxydiisobutylsilane, dimethoxydicyclopentylsilane, diethoxyisobutylisopropylsilane and dimethoxyisopropyl-sec-butylsilane are particularly noteworthy.

Preferably used catalyst systems are those in which the atomic ratio of aluminum from the aluminum compound to titanium from the titanium-containing solid component is from 10:1 to 800:1, in particular from 20:1 to 200:1, and the molar ratio of the aluminum compound to the electron donor compound used as the cocatalyst is from 1:1 to 100:1, in particular from 2:1 to 80:1. The individual catalyst components can be introduced into the polymerization system individually in any order or as a mixture of two components.

Further suitable catalyst systems for the preparation of the semicrystalline propylene homopolymers A) are catalyst systems which contain, as active components, metallocene complexes of metals of subgroup IV or V of the Periodic Table, which complexes differ from those of the formula I and II, and an oligomeric alumina compound. Metallocene complexes of titanium, zirconium, hafnium, vanadium, niobium or tantalum are preferred. Preferably used complexes are those in which the metal atom is bonded via π bonds to unsaturated cyclic hydrocarbon radicals, for example cyclopentadienyl, fluorenyl or indenyl groups. Furthermore, in the preferably used complexes, the metal atom may also be bonded to further ligands, in particular to fluorine, chlorine, bromine or iodine, or to $C_1$–$C_{10}$-alkyl, for example methyl, ethyl, propyl or butyl.

Particularly preferred metallocene complexes are of the following formula V

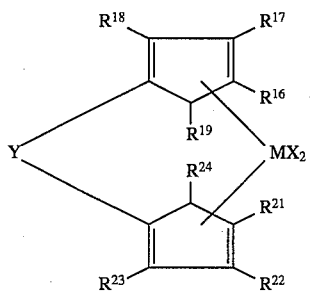

where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl or -$OR^{20}$, $R^{20}$ is $C_1$–$C_{10}$-alkyl, $C_6$–$C_{15}$-aryl, alkylaryl, arylalkyl, fluoroalkyl or fluoroaryl having in each case 1 to 10 carbon atoms in the alkyl radical and 6 to 20 carbon atoms in the aryl radical, $R^{16}$ to $R^{19}$ and $R^{21}$ to $R^{24}$ are each hydrogen, $C_1$–$C_{10}$-alkyl, 5-membered to 7-membered cycloalkyl, which in turn may carry $C_1$–$C_{10}$-alkyl radicals as substituents, $C_6$–$C_{15}$-aryl or arylalkyl, where two adjacent radicals together may furthermore be a cyclic saturated, partly saturated or unsaturated group of 4 to 15 carbon atoms, or $Si(R^{25})_3$, $R^{25}$ is $C_1$–$C_{10}$-alkyl, $C_6$–$C_{15}$-aryl or $C_3$–$C_{10}$-cycloalkyl, Y is $R^{26}R^{27}Z<$ or

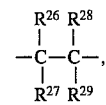

Z is silicon, germanium, tin or carbon and $R^{26}$, $R^{27}$, $R^{28}$ and $R^{29}$ are each hydrogen, $C_1$–$C_{10}$-alkyl, $C_3$–$C_{10}$-cycloalkyl or $C_6$–$C_{15}$-aryl, where two adjacent radicals together may furthermore be a cyclic group of 4 to 15 carbon atoms.

Particularly suitable compounds of the formula V are those in which $R^{16}$ and $R^{21}$ are identical and are each $C_1$–$C_{10}$-alkyl, $R^{19}$ and $R^{24}$ are identical and are each hydrogen, methyl, ethyl, isopropyl or tert-butyl, $R^{17}$, $R^{18}$, $R^{22}$, $R^{23}$ where $R^{18}$ and $R^{23}$ are each $C_1$–$C_4$-alkyl, $R^{17}$ and $R^{22}$ are each hydrogen or two adjacent radicals $R^{17}$ and $R^{18}$, and $R^{22}$ and $R^{23}$, together form a cyclic group of 4 to 12 carbon atoms, $R^{26}$, $R^{27}$, $R^{28}$ and $R^{29}$ are each hydrogen or $C_1$–$C_8$-alkyl, M is zirconium or hafnium and X is chlorine.

Examples of particularly suitable complexes include dimethylsilanediylbis(cyclopentadienyl)zirconiumdichloride, dimethylsilanediylbis(indenyl)zirconium dichloride, dimethylsilanediylbis(tetrahydroindenyl) zirconium dichloride, ethylenebis(cyclopentadienyl)zirconiumdichloride, ethylenebis(indenyl)zirconium dichloride, ethylenebis(tetrahydroindenyl)zirconium dichloride, ethylenebis(2-methylindenyl)zirconium dichloride, ethylenebis(2-methylindenyl)hafnium dichloride, ethylenebis(2-methylbenzindenyl)zirconium dichloride, ethylenebis(2-methylbenzindenyl)hafnium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(3-tert-butyl-5-methylcyclopentadienyl)dimethylzirconium, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(2-methyl-5-methylcyclopentadienyl)zirconium dichloride, dimethylsilanediylbis(2-ethyl-5-isopropylcyclopentadienyl)zirconium dichloride, dimethylsilanediylbis(2-methylbenzindenyl)zirconium dichloride, dimethylsilanediylbis(2-methylindenyl)hafnium dichloride and isopropylidenecyclopentadienylfluorenylzirconium dichloride.

Such complexes can be synthesized by methods known per se, the reaction of the correspondingly substituted, cyclic hydrocarbon anions with halides of titanium, zirconium, hafnium, vanadium, niobium or tantalum being preferred. Examples of corresponding preparation processes are described in, inter alia, J. Organometal. Chem. 369 (1989), 359–370.

The metallocene complexes may also be in cationic form, as described in EP-A 277 003 and EP--A 277 004. μ-Oxo-bis(chlorobiscyclopentadienyl)zirconium may also be used as the metallocene complex.

In addition to the metallocene complexes, the catalyst systems used also contain oligomeric alumina compounds. For example, open-chain or cyclic alumoxane compounds of the formula VI or VII

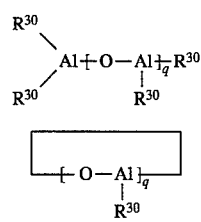

where $R^{30}$ is $C_1$–$C_4$-alkyl, preferably methyl or ethyl, and q is an integer from 5 to 30, preferably from 10 to 25, are suitable.

The preparation of these oligomeric alumoxane compounds is usually carried out by reacting a solution of trialkylaluminum with water and is described in, inter alia, EP-A 284 708 and U.S. Pat. No. 4,794,096.

As a rule, the oligomeric alumoxane compounds obtained are in the form of mixtures of both linear and cyclic chain molecules of different lengths, so that q is to be regarded as an average value. The alumoxane compounds may also be in the form of a mixture with other metal alkyls, preferably with alkylaluminums.

It has proven advantageous to use the complex of metals of subgroup IV and V of the Periodic Table and the oligomeric alumoxane compound in amounts such that the atomic ratio of aluminum from the oligomeric alumoxane compound to the transition metal from the complex of metals of subgroup IV and V of the Periodic Table is from 10:1 to $10^6$:1, in particular from 10:1 to $10^4$:1.

Conventional aromatic hydrocarbons, preferably of 6 to 20 carbon atoms, in particular xylenes and toluene and mixtures thereof, are used as solvents for these catalyst systems.

Supported metallocene complexes may also be used. Suitable carriers are, for example, silica gels, preferably those of the formula $SiO_2 \cdot a\ Al_2O_3$, where a is from 0 to 2, preferably from 0 to 0.5, ie. essentially aluminosilicates or silica. The carriers preferably have a particle diameter of from 1 to 200 μm, in particular from 30 to 80 μm. Such products are commercially available, for example as Silica Gel 332 from Grace.

Suitable catalyst systems for the preparation of propylene homopolymers B) are those which contain, as active components, a metallocene complex of the formula I or II

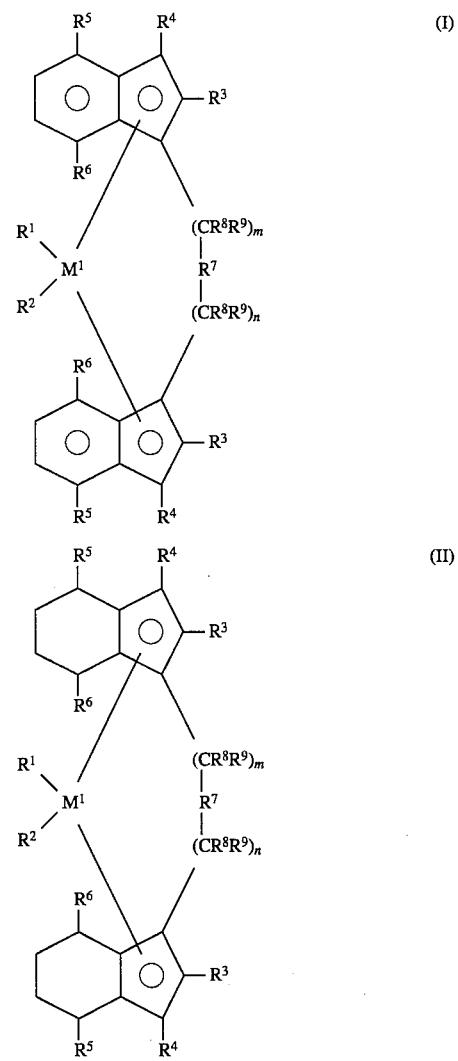

where
$M^1$ is a metal of group IVb, Vb or VIb of the Periodic Table, $R^1$ and $R^2$ are identical or different and are each hydrogen, $C_1$–$C_{10}$-alkyl, $C_1$–$C_{10}$-alkoxy, $C_6$–$C_{10}$-aryl, $C_6$–$C_{10}$-aryloxy, $C_2$–$C_{10}$-alkenyl, $C_7$–$C_{40}$-arylalkyl, $C_7$–$C_{40}$-alkylaryl, $C_8$–$C_{40}$-arylalkenyl or halogen, $R^3$ and $R^4$ are identical or different and are each hydrogen, halogen, $C_1$–$C_{10}$-alkyl which may be halogenated, $C_6$–$C_{10}$-aryl, -$NR_2^{10}$, -$SR^{10}$, -$OSiR_3^{10}$, -$SiR_3^{10}$ or -$PR_2^{10}$, where $R^{10}$ is halogen, $C_1$–$C_{10}$-alkyl or $C_6$–$C_{10}$-aryl, $R^5$ and $R^6$ are identical or different and have the meanings stated for $R^3$ and $R^4$, with the proviso that $R^5$ and $R^6$ are not hydrogen, $R^7$ is

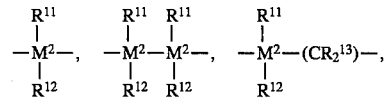

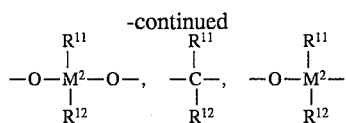

$=BR^{11}$, $=AlR^{11}$, -Ge-, -Sn-, -O-, -S-, $=SO$, $=SO_2$, $=NR^{11}$, $=CO$, $=PR^{11}$ or $=P(O)R^{11}$, $R^{11}$, $R^{12}$ and $R^{13}$ are identical or different and are each hydrogen, halogen, $C_1$–$C_{10}$-alkyl, $C_1$–$C_{10}$-fluoralkyl, $C_6$–$C_{10}$-aryl, $C_6$–$C_{10}$-fluoraryl, $C_1$–$C_{10}$-alkoxy, $C_2$–$C_{10}$-alkenyl, $C_7$–$C_{40}$-arylalkyl, $C_7$–$C_{40}$-arylalkenyl or $C_7$–$C_{40}$-alkylaryl or $R^{11}$ and $R^{12}$ or $R^{11}$ and $R^{13}$ each form a ring with the atoms linking them, $M^2$ is silicon, germanium or tin, $R^8$ and $R^9$ are identical or different and each have the meanings stated for $R^{11}$ and m and n are identical or different and are each zero, 1 or 2, m plus n being zero, 1 or 2.

Alkyl is straight-chain or branched alkyl. Halogen (halogenated) is fluorine, chlorine, bromine or iodine, preferably fluorine or chlorine.

Preferred compounds of the formulae I and II and processes for their preparation are described in EP-A 537 686.

In addition to the metallocene complexes of the general formula I or II, the catalyst systems used also contain oligomeric alumina compounds of the abovementioned general formulae VI or VII. Regarding the ratios of the active components, the statements made in connection with the preparation of the propylene homopolymers A) are applicable. The metallocene complexes of the general formula I or II may likewise be used in supported form, the carriers preferably being identical to or the same as that in the preparation of the propylene homopolymers A).

The novel propylene polymers can be prepared in suspension, in liquid monomers, in inert solvents and in particular in the gas phase. The polymerization conditions are not critical as such, pressures of from 0.5 to 3000, preferably from 1 to 80, bar and temperatures of from −50 to +300° C., preferably from −20 to 100° C., having proven suitable. The average molecular weight of the polymers formed can be controlled by the methods usually employed in polymerization technology, for example by changing the reaction temperatures or by adding regulators, such as hydrogen or $C_2$–$C_8$-alk-1-enes, with the result that small amounts, but not more than 0.5, in particular not more than 0.2, % by weight of $C_2$–$C_8$-alk-1-enes may be found in the novel propylene polymer.

In the preferred process leading to the novel propylene polymers, the individual catalyst systems are used, depending on their particular polymerization activities, in ratios such that the desired polymer composition is obtained.

The novel propylene polymers contain component A), preferably in an amount of from 30 to 95% by weight and component B) preferably in an amount of from 5 to 70% by weight.

Preferred propylene homopolymers A) have a melting point of from 135 to 165° C. and a glass transition temperature which is greater than −5° C.

Preferred propylene homopolymers B) are semicrystalline and have a melting point below 125° C. and a glass transition temperature which is less than −15° C.

The novel propylene polymers have a balanced property profile, in particular good low-temperature impact strength. Process engineering advantages are obtained by the use of one monomer, as well as by virtue of the fact that the process for the preparation of the novel propylene polymers can be carried out in one reaction zone. The novel propylene polymers can be readily processed, can be used in many areas and are particularly suitable for the production of fibers, films and moldings.

EXAMPLES

EXAMPLE 1

1.1 Preparation of a Carrier 56 ml of a solution of 6.4 g of triethylaluminum in 48 ml of heptane were added dropwise to a suspension of 20.2 g of silica gel (Grace, SG 332, particle diameter 20–45 μm) in 200 ml of heptane at room temperature in the course of 30 minutes. During this procedure, the temperature increased to 44° C. Stirring was carried out for 18 hours at room temperature, after which the product was filtered off, washed with twice 30 ml of heptane and with twice 30 ml of pentane and then dried under reduced pressure from an oil pump.

1.2 Preparation of the Supported Catalyst Systems 17 ml (≐ 26 mmol) of a solution of methylalumoxane in toluene (1.53 molar, Witco) were added to a solution of 30 ml of toluene, 40 μmol of dimethylsilanediylbis(2-methylbenzo[e]indenyl)zirconlure dichloride (≐23 rag) and 25 μmol of rac[1, 2-ethanediylbis{1-(4,7-dimethyl-4,5,6,7-tetrahydroindenyl)}]zirconium dichloride (≐12 rag) and stirring was carried out for 15 minutes. Thereafter, 5 g of the carrier prepared in 1.1 were added and stirring was continued for a further 30 minutes. Finally, the solvent was removed at room temperature in the course of 4 hours under reduced pressure from an oil pump. A free-flowing catalyst powder comprising two metallocene catalyst systems was formed.

1.3 Polymerization 20 g of polypropylene granules and 12 ml of triethylaluminum (1 molar solution in heptane) were added in succession to a dry, nitrogen-flushed 10 liter autoclave and stirred for 15 minutes. Thereafter, 1.5 g of the supported catalyst prepared in 1.2 were introduced into the reactor in a countercurrent nitrogen stream, and the reactor was closed. At a stirrer speed of 350 rpm, the mixture was heated to 70° C. and at the same time the internal pressure was gradually increased to the final pressure of 28 bar by introducing propylene. Polymerization was then carried out for 1.5 hours, fresh propylene being introduced by the automatic pressure control. After the end of the reaction, the pressure was let down to atmospheric pressure in the course of 10 minutes, and the resulting polymer, which consisted of two different propylene homopolymers, was discharged in a stream of nitrogen. The corresponding polymerization results are listed in the table.

EXAMPLE 2

2.1 Metallocene-Containing Catalyst System of the Formula (II)

60 μmol of rac[1,2-ethanediylbis{1-(4,7-dimethyl-4,5,6,7-tetrahydroindenyl)}]zirconium dichloride (29 mg) and 16 ml (24 mmol) of a 1.53 molar solution of methyl alumoxane in toluene were used similarly to the process described in Example 1.2.

2.2 Ziegler-Natta Catalyst System 20 g of $SiO_2$ (SG 332 from Grace, having a particle diameter of from 20 to 45 μm) were suspended in 200 ml of n-heptane, and 25.33 ml of n-butyl-n-octylmagnesium were added at 20° C. The suspension was heated to the reflux temperature and was kept under reflux for 30 minutes. After subsequent cooling of the suspension to room temperature, chlorination was effected with excess HCl beginning at 60° C. for two hours and 19.41 ml of ethanol were then added at room temperature. The mixture was first kept under reflux for 30 minutes and, after further cooling to 25° C., 17.07 ml of titanium tetrachloride were added, after which the mixture was heated again to 60° C. and 2.94 ml of di-n-butyl phthalate were added at this temperature. The mixture was kept under reflux for one hour. The resulting suspension was filtered and was washed with 160 ml of ethylbenzene. Drying gave 29.2 g of the catalyst intermediate, The catalyst intermediate obtained was extracted with a mixture of 450 ml of ethylbenzene and 50 ml of titanium tetrachloride in a heatable extraction frit at a jacket temperature of 125° C. while stirring for 60 minutes. The catalyst was then washed with three times 120 ml of n-hexane and once with 120 ml of n-pentane and was dried in a stream of nitrogen. The catalyst contained 2.0% by weight of magnesium.

Thereafter, the titanium-containing solid component was first subjected to prepolymerization and then deactivated. For this purpose, 700 ml of n-heptane were initially taken in a 1 l glass autoclave provided with a stirrer, and the reaction vessel was cooled to an internal temperature of 5° C. 47.4 ml of triethylaluminum (in the form of a 1.0 molar solution in n-heptane) and 6.26 ml of dimethoxyisobutylisopropylsilane (in the form of a 1.0 molar solution in n-heptane) were added to the solvent. 20 g of the titanium-containing solid component prepared were then added. Gaseous propylene (flow rate: 40 l/h) was then passed in continuously at a pressure of 1 bar via an inlet tube for 1 hour while stirring. During the addition of the propylene, the internal temperature was kept at from 5 to 20° C. After the addition of propylene was complete, gaseous, dry $CO_2$ (flow rate: 14.5 l/h at 1 bar) was then passed continuously into the catalyst suspension via an inlet tube for 1 hour while stirring. The catalyst suspension having polymerization activity was thus deactivated.

90 g of a solid which contained 3.1 parts by weight of polypropylene per part by weight of catalyst solid were obtained.

The resulting solid is the Ziegler-Natta catalyst system.

2.3 Polymerization

The polymerization of the propylene was carried out similarly to Example 1.3 in a reaction zone in the presence of 1.3 g of the Ziegler-Natta catalyst system prepared according to Example 2.2 and 0.5 g of the metallocene-containing catalyst system described in Example 2.1. The corresponding polymerization results are shown in the table.

EXAMPLE 3

3.1 Preparation of the Supported Catalyst Systems

In a process similar to that described in 1.2, 25 μmol of rac[1,2-ethanediylbis{1-(4,7-dimethyl-4,5,6,7-tetrahydroindenyl)}]zirconium dichloride ($\hat{=}12$ mg) were dissolved in 20 ml of toluene and added to 6.5 ml ($\hat{=}10$ mmol) of a solution of methylalumoxane in toluene (1.53 molar, Witco) and stirring was carried out for 15 minutes. Thereafter, 5 g of the Ziegler-Natta catalyst system prepared in 2.2 were added and stirring was continued for a further 30 minutes. Finally, the solvent was removed at room temperature in the course of 4 hours under reduced pressure from an oil pump. A free-flowing catalyst powder comprising a Ziegler-Natta and a metallocene catalyst system was formed.

3.2 Polymerization

The polymerization was carried out by a process similar to that described in 1.3, using 1.5 g of the supported catalyst prepared in 3.1. The corresponding polymerization results are shown in the table.

The melting points and glass transition temperatures of the propylene polymers obtained were determined by means of DSC measurements (10° C./1 min heating rate). In all samples, two melting points and two glass transition temperatures, each of which could be assigned to the two components A) and B), were found.

The G modulus was determined according to DIN 53 445 and the Charpy impact strengths an according to DIN 53 453.

The productivities [g per g of catalyst per h] are based on the total amount of the catalyst, ie. on the sum of the amounts of the two different catalyst systems.

The separation according to TREF (Temperature Rising Elution Fractionation) served to determine the particular amounts of the propylene homopolymers A) [formed over the Ziegler-Natta catalyst system or over the metallocene-containing catalyst system which differs from that of the formula (I) or (II)] and the amount of the propylene homopolymer B) [formed over the metallocene-containing catalyst system of the formula (I) or (II)]. For this purpose, fractions were eluted from the total propylene polymer with the aid of xylene at different, increasing temperatures. The fraction obtained at 80° C. corresponded to the propylene homopolymer B), and the collected fraction eluted at 100° C. and 130° C. corresponded to the propylene homopolymer A) (US-A 50 30 713; L. Wild Advances in Polymer Science 98 (1990), 1–47.

TABLE

| Example | Yield [g] | Productivity [g per g of cat. per h] | Melting point [°C.] A) | Melting point [°C.] B) | Glass transition temperatures [°C.] A) | Glass transition temperatures [°C.] B) | G modulus [N/mm$^2$] |
| --- | --- | --- | --- | --- | --- | --- | --- |
| 1 | 1380 | 613 | 145 | 119 | −2 | −22 | 600 |
| 2 | 1160 | 430 | 163 | 120 | 1 | −23 | 560 |
| 3 | 1430 | 635 | 162 | 121 | 0 | −22 | 550 |

| Impact strength $a_n$ [kJ/m$^2$] | | | Separation according to TREF [% by weight] | | |
| --- | --- | --- | --- | --- | --- |
| at 23° C. | at 0° C. | at −20° C. | 80° C. | 100° C. | 130° C. |
| n.f. | n.f. | 40 | 23.2 | 69.8 | 7.0 |
| n.f. | n.f. | 30 | 24.0 | 46.7 | 29.3 |
| n.f. | n.f. | 35 | 26.1 | 49.3 | 24.6 |

TABLE-continued n.f. . . . not fractured

We claim:

1. A propylene polymer containing
   A) a semicrystalline propylene homopolymer having a melting point of 125 to 165° C. and a glass transition temperature which is greater than −10° C. and
   B) a semicrystalline propylene homopolymer having a melting point below 130° C. and a glass transition temperature which is less than or equal to −10° C. or a non-crystallizing propylene homopolymer having a glass transition temperature which is less than or equal to −10° C.

2. A propylene polymer as defined in claim 1, obtained by preparing the propylene homopolymer B) using a catalyst system which contains, as active components, a metallocene complex of the formula I or II

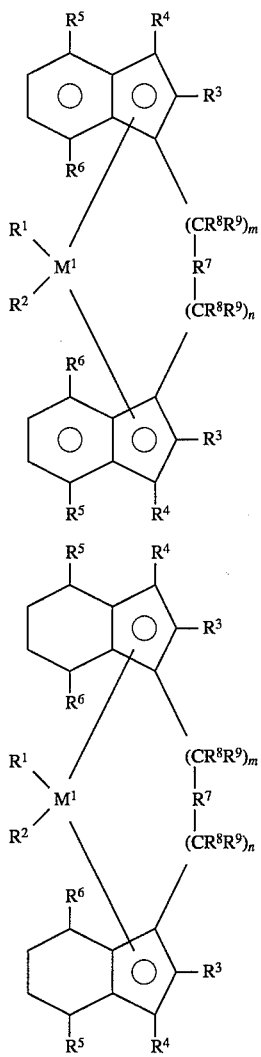

where

M$^1$ is a metal of group IVb, Vb or VIb of the Periodic Table,

R$^1$ and R$^2$ are identical or different and are each hydrogen, C$_1$-C$_{10}$-alkyl, C$_1$-C$_{10}$-alkoxy, C$_6$-C$_{10}$-aryl, C$_6$-C$_{10}$-aryloxy, C$_2$-C$_{10}$-alkenyl, C$_7$-C$_{40}$-arylalkyl, C$_7$-C$_{40}$-alkylaryl, C$_8$-C$_{40}$-arylalkenyl or halogen, R$^3$ and R$^4$ are identical or different and are each hydrogen, halogen, C$_1$-C$_{10}$-alkyl which may be halogenated, C$_6$-C$_{10}$-aryl, -NR$_2^{10}$, -SR$^{10}$, -OSiR$_3^{10}$, -SiR$_3^{10}$ or -PR$_2^{10}$ where R$^{10}$ is halogen, C$_1$-C$_{10}$-alkyl or C$_6$-C$_{10}$-aryl, R$^5$ and R$^6$ are identical or different and have the meaning stated for R$^3$ and R$^4$, with the proviso that R$^5$ and R$^6$ are not hydrogen, R$^7$ is

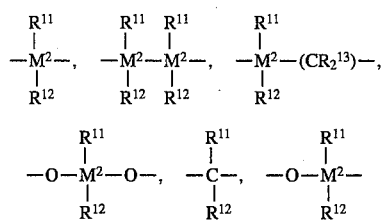

=BR$^{11}$, =AlR$^{11}$, -Ge-, -Sn-, -O-, -S-, =SO, =SO$_2$, =NR$^{11}$, =CO =PR$^{11}$ or =P(O)R$^{11}$,

R$^{11}$, R$^{12}$ and R$^{13}$ are identical or different and are each hydrogen, halogen, C$_1$-C$_{10}$-alkyl, C$_1$-C$_{10}$ fluoralkyl, C$_6$-C$_{10}$-aryt, C$_6$-C$_{10}$-fluoraryl, C$_1$-C$_{10}$-alkoxy, C$_2$-C$_{10}$-alkenyl, C$_7$-C$_{40}$-arylalkyl, C$_8$-C$_{40}$-arylalkenyl or C$_7$-C$_{40}$-alkylaryl or R$^{11}$ and R$^{12}$ or R$^{11}$ and R$^{13}$ each form a ring with the atoms linking them, M$^2$ is silicon, germanium or tin, R$^8$ and R$^9$ are identical or different and each have the meaning stated for R$^{11}$ and m and n are identical or different and are each zero, 1 or 2, m plus n being zero, 1 or 2, and a oligomeric alumina compound.

3. A propylene polymer as defined in claim 1, obtained by preparing the propylene homopolymer A) using a Ziegler-Natta catalyst system.

4. A propylene polymer as defined in claim 1, obtained by preparing the propylene homopolymer A) using a catalyst system which contains, as active components, metallocene complexes of metals of subgroup IV or V of the Periodic Table, which complexes differ from those of the formula I and II, and an oligomeric alumina compound.

5. A process for the preparation of a propylene polymer as defined in claim 1, wherein components A) and B) are prepared together in one reaction zone.

6. A process for the preparation of a propylene polymer as defined in claim 5, which is carried out in the gas phase.

7. A fiber, film or molding obtained from a propylene polymer as defined in claim 1 as the essential component.

* * * * *

UNITED STATES PATENT AND TRADEMARK OFFICE
CERTIFICATE OF CORRECTION

PATENT NO.: 5,483,002

DATED: January 9, 1996

INVENTOR(S): SEELERT et al.

It is certified that error appears in the above-identified patent and that said Letters Patent is hereby corrected as shown below:

Claim 2, column 12, line 37, "$C_6$-$C_{10}$-aryt" should read --$C_6$-$C_{10}$-aryl--.

Signed and Sealed this

Nineteenth Day of March, 1996

Attest:

BRUCE LEHMAN

*Attesting Officer*     *Commissioner of Patents and Trademarks*